April 12, 1960
P. JAHN
2,932,191
APPARATUS FOR EQUILIBRATING SMALL
DISK-SHAPED ROTARY BODIES
Filed March 14, 1956
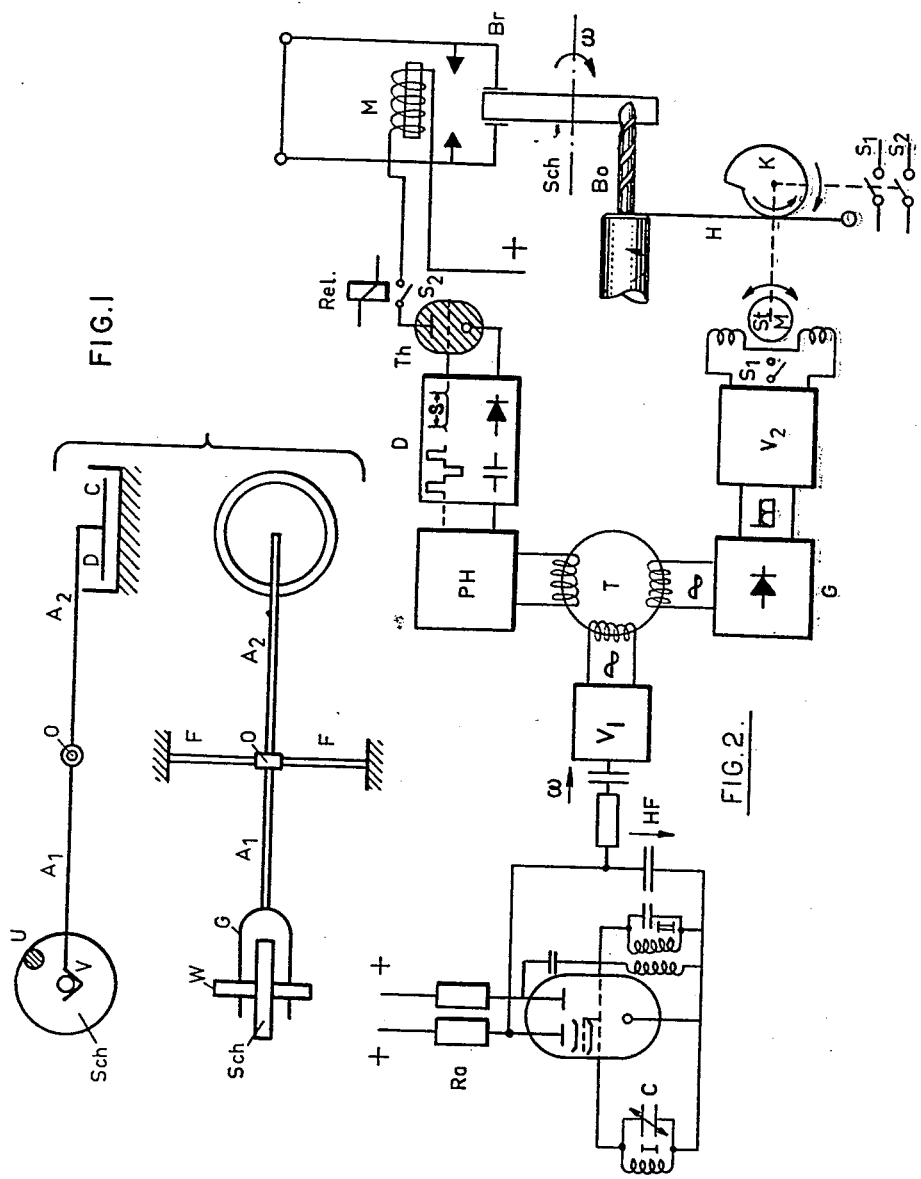
INVENTOR:
PAUL JAHN
BY
Young, Emery & Thompson
ATTORNEYS

2,932,191
APPARATUS FOR EQUILIBRATING SMALL DISK-SHAPED ROTARY BODIES

Paul Jahn, Schramberg, Germany

Application March 14, 1956, Serial No. 571,503

Claims priority, application Germany March 30, 1955

5 Claims. (Cl. 77—5)

The invention relates to a method of equilibrating in particular small disk-shaped rotary bodies and arrangement of carrying out this method.

The function of the arrangement is to determine and, if necessary, rectify the unbalance particularly of timepiece balances. To attain this, it is necessary to ascertain by measurement the amount of unbalance and its position on the balance. When this has been done the unbalance can be corrected by drilling a hole to a certain depth at a particular point on the balance wheel.

The invention discloses a method and suitable arrangement for ascertaining quickly and reliably the amount of the unbalance and its position by measuring technique, in such a manner that the measurement or measurements ascertained can be utilized for adjusting, preferably automatically, an instrument, for example a drilling device, for correcting the unbalance.

The method according to the invention consists in imparting rotary motion to the body to be equilibrated and utilizing its bearing forces, caused to act during the rotary motion, for controlling the apparent impedance of an electric circuit and thus producing in this circuit an alternating potential, the amplitude and phase relation of which constitute a measurement for the amount and position of the unbalance to be rectified.

The method is preferably carried out by imparting rotary motion to the body to be equilibrated on a mechanical oscillating system and this system controls the apparent impedance of an electric circuit. At the same time it is advisable for the body to be equilibrated to be caused to rotate on the oscillating system with a rotational frequency which substantially corresponds to the fundamental frequency of the oscillatory system, or possibly is less than this by a small amount.

An arrangement for carrying out the method according to the invention preferably utilizes the following means either singly or in combination:

The influencing of the electric circuit as regards its apparent impedance is effected by capacitative, inductive or optical means.

The alternating voltage produced in the said electric circuit is utilized for the amplitude moduation of a high-frequency produced by a generator and which may be for example 10,000 hertz or higher, and means are provided for amplifying the modulated high-frequency and subsequently rectifying it so as to recover the modulated frequency.

If a mechanical oscillatory system is used, this can be an oscillatory scale beam on which the rotary body is mounted for example in a fork.

Means may be provided for selectively adjusting the damping of the mechanical oscillatory system.

For rectifying the detected unbalance, a drilling device may be employed the drilling depth of which is set by a controlling device which is itself controlled according to the amplitude of the stresses produced by the rotary body to be balanced.

For determining the position of the unbalance on the body to be equilibrated, an arrangement is provided which leads off impulses from the zero passages of the alternating potential and these impulses control a braking device which then stops the rotary body in a suitable position. At the same time it is advisable to construct this controlling device so that the braking effect is only released when there is resonance between the rotational frequency of the body to be equilibrated and the natural frequency of the mechanical oscillatory system or when a definite distuning prevails as regards the resonance position.

An embodiment of the invention is illustrated by way of example in the two figures of the accompanying drawings, in which:

Fig. 1 shows diagrammatically the arrangement of the body to be equilibrated on a scale beam which capacitatively controls the fundamental resistance of coupled-up circuit, and Fig. 2 shows the diagram of connections of an arrangement for the automatic determination of the unbalance of a rotary body, and also the mechanical elimination of the unbalance.

The references used in the figures have the following designations: Sch is the body to be equilibrated, for example a timepiece balance wheel. U designates the unbalance thereof. $A_1$ and $A_2$ are the arms of a beam of a scale arrangement. The arm $A_1$ has a forked bearing V at one end. The arm $A_2$ carries a condenser armature C at one end. F is a spring suspension of the beam. The beam is secured to the spring at O. The scale beam arrangement represents a mechanical oscillating system, the fundamental frequency of which is the product of the inertia of the arrangement and the resiliency of the spring F. The damping of this oscillating system can be regulated in known manner, for example by employing damping means actuated by alternating current effects or by using means based on air damping.

If the disk Sch is rotated, which can be effected, for example, by blowing by means of an air current, the unbalance U thereof causes a periodically fluctuating axial pressure by which the scale beam arrangement is caused to oscillate. These oscilations are particularly great when there is resonance between the natural frequency of the scale beam system and the rotational frequency of the disk. By adjusting the damping effect of the scale system it is possible to cause the oscillations of the balance beam system to assume a certain amplitude value at the resonance.

In Fig. 2 the condenser C is shown in the input control grid circuit of a triode-hexode. The triode system of the triode-hexode, using an oscillatory circuit II, produces a suitable high-frequency, which is fed to the second grid of the hexode system. The imput circuit of the hexode system is formed by an inductance and the condenser C connected in parallel. The high-frequency, modulated according to the oscillations of the condenser C, is tapped on the outer resistance Ra of the hexode system; the modulation frequency ω corresponds to the rotational frequency of the disk Sch to be equilibrated. $V_1$ is an amplifier which feeds the modulation frequency after rectification to a tranformer T.

The modulation frequency ω in the rectifier stage G and an amplifier stage $V_2$ is fed to the input circuit of a regulating motor StM. A plate cam K is mounted on the axle of the motor StM and a lever H bears against this cam. The lever H limits the drilling depth of a drill Bo. The regulating motor StM is so constructed that it sets the plate cam K to greater drilling depths the greater the amplitude of the oscillations fed to it and derived from the controlling alternating voltage ω is, if this voltage is zero, the motor StM is automatically set back to its position of rest. A switch $S_1$ is provided in the electric circuit of the regulating motor $StM$ and when this switch is opened, the regulating motor is stopped in the position in which it actually occupies at the time. Simultaneously with the opening of the switch $S_1$, the electric circuit of a relay $Rel$ is closed which, on being excited, closes a switch $S_2$.

The alternating frequency $\omega$ is fed from the transformer T to a phase regulator $Ph$. From this the alternating voltages are fed to a differentiation stage which, by overbiasing, produces from the alternating voltage a square voltage (meander voltage) and from this impulses $s$ by differentiation and rectification. The rectification only allows impulses to occur at each second zero passage of the alternating voltage $\omega$, that is, one impulse will be produced during each revolution of the disk $Sch$.

The impulses $s$ control the imput circuit of a thyratron $Th$.

The anode circuit of the thyratron $Th$ feeds over a contact $S_2$, which is closed when the above mentioned relay $Rel$ is excited, the magnet coil M of a braking device $Br$, the object of which is to stop the rotating disk $Sch$. When the disk has been stopped, the drill $Bo$ can be switched on and a hole drilled in the disk.

The arrangement according to the invention operates in the following manner:

If the disk $Sch$ to be equilibrated is brought to a rotational frequency which is considerably higher than the resonance frequency of the scale beam, the rotating unbalance U first causes oscillations in the scale beam of very small amplitude. Consequently the amplitude of the alternating voltage transmitted by the transformer T is only very small and the regulating motor $StM$ is turned only slightly out of its position of rest. Now, if the rotational frequency of the disk $Sch$ drops and approximates the resonance frequency of the scale beam, the amplitude of the alternating voltage transmitted from the transformer T increases and the regulating motor $StM$ rotates and with it the plate cam K, the adjusting lever H of the drill $Bo$ being thereby set for a deeper drilling depth. In the resonance position the alternating voltage transmitted from the transformer T is at its maximum, the regulating motor $StM$ attains its greatest adjustment and the plate cam K or rather the adjusting lever H is set for deepest drilling depth.

If the disk $Sch$ were allowed to continue to run, its rotational frequency would exceed the resonance of the scale beam system and the amplitude of the alternating voltage transmitted from the transformer T again become less. Therefore the regulating motor $StM$ and the plate cam K would again approach their zero position, that is, the adjusting lever H would be set back for shallower drilling depths.

In operation, however, the imput circuit of the regulating motor, owing to the switch $S_1$ being actuated manually, is laid dead when the resonance is reached, that is, when the regulating motor $StM$ and the plate cam K just come to a standstill.

A thyratron is ignited if both its grid voltage is positive and there is also a positive voltage on the anode. Consequently, in order to interrupt the thyratron current, it is necessary to take off the positive anode voltage.

Therefore, as long as the contact $S_2$ is open, the impulses derived from the differentiating instrument D cannot cause the thyratron to ignite because there is no voltage on the anode of the thyratron owing to the switch $S_2$ being open. Simultaneously with the opening of the switch $S_1$ and the stopping of the regulating motor, the coil of the relay $Rel$ is excited and the switch $S_2$ closed. The next impulse on the control grid of the thyratron ignites the thyratron which at first also remains ignited.

The thyratron current operates a magnet M which sets a frictional brake $Br$ in operation and arrests the rotating disk $Sch$.

The drill $Bo$ can now be switched on and drills a hole in the position in which the disk $Sch$ is stopped to a depth determined by the adjustment of the plate cam K.

It is merely a question of the proper phase relation adjustment of the phase shifter $Ph$ and of the amplifier $V_2$ that the drilling of the hole in such a position and to such a depth that a compensation of the previously existing unbalance U is effected, takes place. The phase shifter $Ph$ and the amplifier $V_2$ are operated in such a way that the hole is drilled to such depth which is determined by the adjustment of the plate cam K.

When the hole has been drilled, the switch $S_1$, after the drill has been withdrawn from the hole, is again closed with the result that the current of the relay $Rel$ is simultaneously interrupted and the switch $S_2$ opened. The thyratron, hitherto under current, is then cut out with the result that the friction brake $Br$ is released.

As, however, the disk $Sch$ is standing still, the transformer T feeds no alternating current and the regulating motor $StM$ turns back into its position of rest.

Instead of taking the measurement in the case of a rotational frequency of the disk $Sch$ which is in resonance with the frequency of the scale beam system, it is also possible, for example, to operate near the resonance by first observing the maximum amplitude of the adjustment of the plate cam K and then waiting until the displacement thereof has diminished to a certain fraction. This means that the rotational frequency has dropped by a certain defined degree below the resonance frequency; if, however, one always works with an amplitude of adjustment of the plate cam K which is in a certain relationship to the previously observed maximum amplitude, one has the certainty of working under conditions which can be reproduced in proper phase relation.

The production of alternating voltage on the input control grid of the triode-hexode is due to the fact that the condenser C with fluctuating value of capacity, forms with the grid cathode capacity a periodically varying potentiometer on which the negative direct voltage formed on the cathode resistance of the triode-hexode is split up.

The arrangement might therefore be such that a magnet core is arranged on the arm $A_2$ of the scale beam and moved towards a coil located in the grid circuit of the triode-hexode; an inductive control of the apparent resistance of the input circuit of the triode-hexode then takes place, possibly combined with pure induction effect.

The mechanical system on which the body to be equilibrated is caused to rotate might also be provided with a carbon microphone or a piezo-electric body, so as to thereby produce, according to its oscillation, alternating voltages on the input grid of the triode-hexode. A photoelectric potentiometer, for example, might also be provided in the input circuit of the tube and the photoelectric element thereof influenced by a light ray controlled by the moved mechanical system.

Instead of the triode-hexode circuit shown in Fig. 2 some other wiring arrangement might be employed which feeds alternating voltage of suitable intensity to the transformer T according to the rotation of the disk $Sch$ and its bearing forces exerted thereby.

I claim:

1. Apparatus for balancing a wheel-shaped workpiece comprising means for rotating the said workpiece on an oscillatable mechanical supporting system with a frequency of rotation essentially in resonance with the frequency of oscillation of the said supporting mechanical system, said mechanical system being provided with electromechanical transducer means for modulating the amplitude of a high frequency current generator, means for detecting the amplitude modulation of the said high frequency current, and supplying the demodulated high frequency current to a first control circuit for adjusting the drilling depths of a drilling device for drilling balancing holes into the workpiece to be balanced, said first control circuit comprising a reversible control motor and means for arresting the same at a maximum amplitude of the demodulated current, and means for supplying the demodulated high frequency current to a second control circuit for tripping a brake in a predetermined phase of the demodulated high frequency current.

2. Apparatus according to claim 1, in which the supporting mechanical system consists of an oscillatable balance lever.

3. Apparatus according to claim 1, in which the rotational frequency of the workpiece is equal to the resonance frequency of the mechanical system.

4. Apparatus according to claim 1, in which the rotational frequency of the workpiece lies in the range of the resonance frequency of the supporting system, being smaller than the same.

5. Apparatus according to claim 1, in which the pulses for controlling the tripping means of the braking device are derived from the demodulated high frequency current by means of differentiators.

References Cited in the file of this patent

UNITED STATES PATENTS

| | | |
|---|---|---|
| 2,243,379 | Johnson | May 27, 1941 |
| 2,346,975 | Laboulais | Apr. 18, 1944 |
| 2,748,603 | Wilcox | June 5, 1956 |